May 5, 1925.
H. L. GUY ET AL
1,536,092
POWER TRANSMISSION GEARING
Filed May 12, 1921
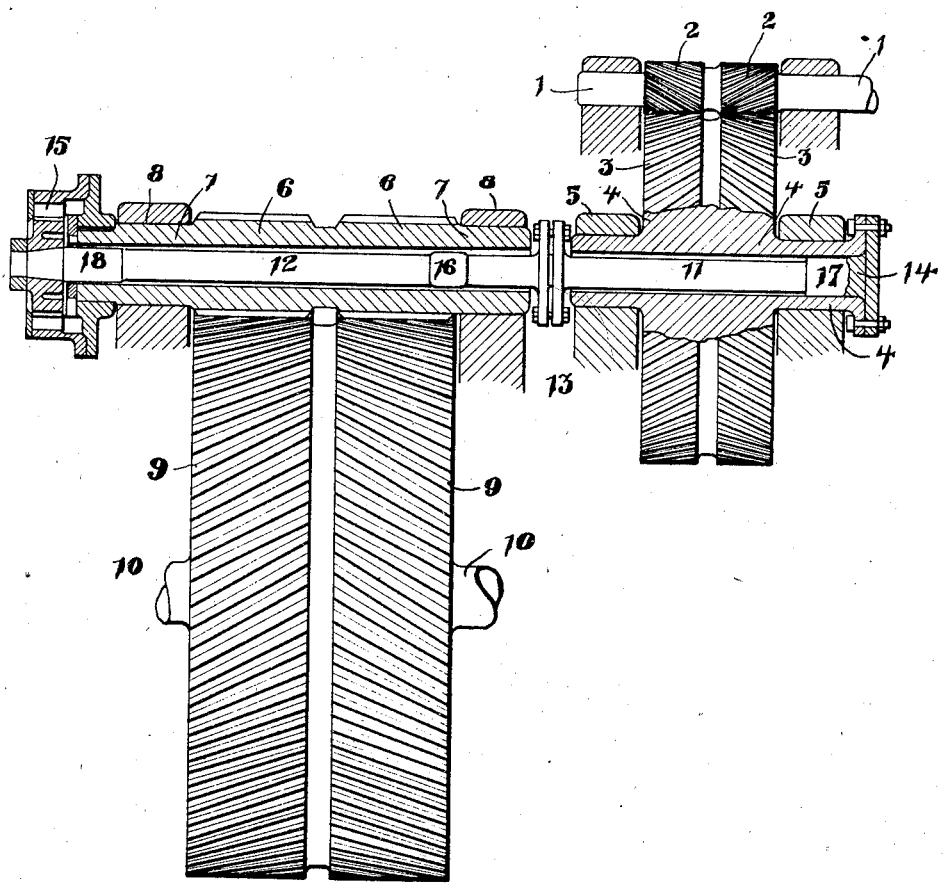
Henry Lewis Guy &
Percy L. Jones
INVENTORS
BY D. C. David
ATTORNEY Patented May 5, 1925.

1,536,092

UNITED STATES PATENT OFFICE.

HENRY L. GUY, OF MANCHESTER, AND PERCY L. JONES, OF ASHTON-ON-MERSEY, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

POWER-TRANSMISSION GEARING.

Application filed May 12, 1921. Serial No. 469,002.

*To all whom it may concern:*

Be it known that we, HENRY L. GUY and PERCY L. JONES, subjects of the King of Great Britain, and residents, respectively, of Trevethin, Albany Road, Victoria Park, Manchester, in the county of Lancaster, England, and 38 Park Ave., Ashton-on-Mersey, county of Chester, England, have invented a new and useful Improvement in Power-Transmission Gearing, of which the following is a specification.

This invention relates to toothed gearing of the double reduction type and has for its object to provide an improved construction and arrangement of gear of this type in which difficulties giving rise to undue wear and other disadvantages due to inaccuracies or irregularities in the formation of the intermeshing teeth of either or both the trains of gears are obviated or reduced.

More particularly, the invention has for its object to provide a double reduction gear so constructed that either train of gearing is capable of accommodating itself to movements either in an axial or in a circumferential direction without such movement being necessarily transmitted to the other train of gearing.

Furthermore, by this improved arrangement sudden changes in angular velocity of either the driven shaft or the driving shaft will be reduced in transmission from one to the other.

According to the invention the intermediate pinion is driven by a torsionally flexible shaft which is attached to the pinion shaft at the end remote from the first reduction gear and is attached at its other end to that end of the intermediate gear wheel shaft which is remote from the intermediate pinion. An extensible coupling is preferably provided at either or both ends of the flexible shaft.

In carrying out the invention the intermediate pinion and the intermediate gear wheel are each mounted on a hollow shaft which encloses either a single torsionally flexible shaft or two such shafts connected to form a single shaft by means of a coupling between their adjacent ends. The single shaft either simple or compound as described is connected by one end to the hollow shaft on which the pinion is mounted and at the other end to the shaft on which the intermediate gear wheel is mounted. Preferably an extensible coupling is provided at either or both ends. To obtain more torsional flexibility the coupling intermediate the ends of the flexible shafts when this construction is adopted may itself be constructed so as to have a certain amount of torsional flexibility.

The accompanying drawing illustrates somewhat diagrammatically a double-reduction gear constructed in accordance with the invention.

Referring to the drawing, a turbine shaft 1 carries a pair of single helical pinions 2 which engage with corresponding intermediate gear wheels 3. Said gear wheels are mounted on or formed integral with a hollow shaft 4 supported in bearings 5. A pair of intermediate pinions 6 are arranged substantially co-axially with the intermediate gear wheels 3 and are mounted on or formed integral with a hollow shaft 7 supported in bearings 8. The intermediate pinions 6 gear with corresponding gear wheels 9 which are mounted on the propeller or other working shaft 10. Passing through the shafts 4 and 7 is a torsionally flexible shaft illustrated as being formed in two parts 11 and 12 connected by a coupling 13. The part 11 is connected by a coupling 14 with the hollow shaft 4 at the end thereof remote from the intermediate pinions 6 and the part 12 is connected to the shaft 7 at the end remote from the gear wheels 3 by a coupling 15 which is indicated as being of an extensible type. Any suitable extensible coupling may be employed, a number of kinds being well known to skilled engineers. As the parts 11 and 12 of the torsionally flexible shaft fit loosely within their respective hollow shafts, supporting collars 16, 17 are shown, suitable arrangements for lubricating such collars being provided. As some portion of the weight of the extensible coupling 15 is carried by the flexible shaft 12, it is desirable to provide a supporting collar at the end of the shaft adjacent said coupling as indicated at 18.

Instead of an extensible coupling 15 at the pinion end of the flexible shaft, such coupling may be provided at the gear wheel end in place of the coupling 14 or extensible couplings may be provided at both ends of the shaft. The coupling 13 may also be arranged to have a certain amount of torsional flexibility and may be extensible if desired or in some cases said coupling may be solid or be dispensed with and the two parts 11, 12 of the flexible shaft be formed as a single piece.

The pinions and gear wheels illustrated are shown as having double helical teeth but they may, of course, be provided with single helical teeth.

It is not a feature of the construction according to this invention that either the pinion or the gear wheel should be capable of movement about an axis which passes approximately through the center of the pinion and is perpendicular to the axis of the pinion and lies in a plane containing the axis of the pinion and the gear wheel driven thereby and it is to be understood that the main purpose of the invention is to provide torsional flexibility between the points of engagement of the power transmitting pinion and the intermediate gear wheel and the intermediate pinion and the gear wheel driven thereby, respectively. A torsionally flexible shaft will as a general rule be also capable of considerable transverse flexure and such flexibility is in certain cases also of advantage.

While we have shown our invention in but one form, it will be obvious to those skilled in the art that it is not so limited but is susceptible of various other changes and modifications, without departing from the spirit thereof and we desire, therefore, that only such limitations shall be placed thereupon as are imposed by the prior art or as are specifically set forth in the appended claims.

What we claim is:

1. In a double reduction gear, the combination of an intermediate gear carried by a hollow shaft or hub portion, an intermediate pinion carried by a hollow shaft or hub portion, a loosely fitting and torsionally flexible shaft construction extending through the shaft or hub portions, couplings for connecting the outer ends of the flexible shaft construction to the outside ends of the hollow shaft or hub portions, one of the latter couplings being of the extensible type, and a bearing collar disposed adjacent to each coupling and a third bearing collar disposed substantially intermediate of said couplings for supporting the flexible shaft construction with respect to the hollow shaft or hub portion.

2. In a double-reduction gear, the combination of an intermediate gear carried by a hollow shaft or hub portion, an intermediate pinion carried by a hollow shaft or hub portion, a loosely fitting and torsionally flexible shaft construction extending through the shaft or hub portions, couplings for connecting the outer ends of the flexible shaft construction to the outside ends of the hollow shaft or hub portions, one of the latter couplings being of the extensible type, a plurality of collars carried by the torsionally flexible shaft construction for supporting the latter with respect to one of the hollow shaft or hub portions, and a single collar carried by the torsionally flexible shaft construction for supporting the latter with respect to the other hollow shaft or hub portion, one of said collars being disposed adjacent to the extensible coupling.

3. In a double-reduction gear, the combination of an intermediate gear carried by a hollow shaft or hub portion, an intermediate pinion carried by a hollow shaft or hub portion alined with respect to the first hollow shaft or hub portion, loosely fitting and torsionally-flexible shafts extending through the hollow shaft or hub portions, a coupling for connecting the adjacent ends of the torsionally flexible shafts, couplings for connecting the outside ends of the coupled torsionally-flexible shafts to the outside ends of the hollow shaft or hub portions, one of the latter couplings being of the extensible type, a bearing collar for supporting one end of one of the torsionally-flexible shafts and a part of the extensible coupling carried by the latter, and a plurality of bearing collars for supporting the remaining torsionally flexible shaft with respect to its cooperating hollow shaft or hub portion.

4. In a double-reduction gear, the combination of an intermediate gear carried by a hollow shaft or hub portion, an intermediate pinion carried by a hollow shaft or hub portion, alined with respect to the first hollow shaft or hub portion, loosely fitting and torsionally-flexible shafts extending through the hollow shaft or hub portions, a coupling for connecting the adjacent ends of the torsionally-flexible shafts, couplings for connecting the outside ends of the coupled torsionally flexible shafts to the outside ends of the hollow shaft or hub portions, one of the latter couplings being of the extensible type, and a plurality of bearing collars interposed between the couplings and carried by the torsionally flexible shafts for supporting the latter with respect to the hollow shaft or hub portions, one of said bearing collars being adjacent to the extensible coupling.

5. In a double-reduction gear, the combination of an intermediate gear carried by a hollow shaft or hub portion and having opposed helical teeth, an intermediate pinion carried by a hollow shaft or hub portion and having opposed helical teeth, a loosely fitting and torsionally flexible shaft construction extending through the hollow hub or shaft portions, couplings for connecting the outside ends of the shaft construction to the outside ends of the hollow hub or shaft portions, one of the couplings being of the extensible type, a plurality of collars carried by the torsionally flexible shaft construction for supporting the latter with respect to one of the hollow shaft or hub portions, and a single collar carried by the torsionally flexible shaft construction for supporting the latter with respect to the other hollow shaft or hub portion, one of said collars being disposed adjacent to the extensible coupling.

In testimony whereof, we have hereunto set our names this fourteenth day of April 1922.

H. L. GUY.
P. L. JONES.